US Patent Number: 4,785,035
Date of Patent: Nov. 15, 1988
Palluel et al.

[54] CURING COMPOSITION

[75] Inventors: August L. L. Palluel, Windsor; Stephen P. Davis, High Wycombe Bucks; Angela C. Fletcher, London, all of United Kingdom

[73] Assignee: Imperial Chemical Industries PLC, London, England

[21] Appl. No.: 114,735

[22] Filed: Oct. 30, 1987

[30] Foreign Application Priority Data

Nov. 14, 1986 [GB] United Kingdom ................. 8627314

[51] Int. Cl.$^4$ ............................................. C08L 75/00
[52] U.S. Cl. ..................................... 524/101; 524/188
[58] Field of Search ................................ 524/101, 188

[56] References Cited

U.S. PATENT DOCUMENTS 4,539,345 9/1985 Hansen ................................ 524/188

OTHER PUBLICATIONS

Roberts et al, *Basic Principles of Organic Chemistry*, W. A. Benjamin Inc, New York, 1964, pp. 483, 484 & 657.

Primary Examiner—Maurice J. Welsh
Attorney, Agent, or Firm—Cushman, Darby & Cushman

[57] ABSTRACT

A curing composition comprising a silane functional acrylic polymer component and a silane functional oligomer component. The polymer component is a co-polymer of functional silyl group-containing units derived from monomers of Formula:

$$CH_2=CR^1CO_2(CH_2)_aL$$

The oligomer component is of formula $$E(GKL)_6$$

in which E is derived from a multifunctional isocyanate oligomer, G is of general formula:

$$-[O(CH_2)_5CO]_c[O(CH_2)_dOCO(CH_2)_2]-$$

and K is of general formula:

$$-[NR^5(CH_2)_m]-$$

and where L is a group of Formula $$Si\begin{array}{c}R^2\\-R^3\\R^4\end{array}$$

9 Claims, No Drawings

CURING COMPOSITION

This invention relates to curing compositions, to a process for their preparation and their use in coatings, particularly in coatings that are cured at ambient or at moderately elevated temperatures in a few hours.

Some decorative and/or protective coating systems and especially those currently used in vehicle repair and re-spraying which cure under such conditions are based on polyisocyanate- polyhydroxyl compositions. These are two-pack paints consisting of an acrylic polymer containing hydroxyl groups and a curing agent containing isocyanate groups. These coating compositions suffer from the disadvantage that precautions have to be taken in the handling and application of isocyanate based compositions to avoid inhalation of isocyanate droplets or prolonged skin contact owing to their known toxicity and sensitising effects.

One solution to these problems associated with isocyanate containing curing compositions is described in Japanese Patent Application No. 60-44549. This describes a two-pack composition containing a urethane prepolymer in which the terminal NCO groups are blocked with a silane coupling agent and a vinyl resin which contains one or more hydrolysable silyl groups per molecule of polymer. These compositions however suffer from poor clarity and appearance together with poor solvent and water resistance.

Certain compositions have now been invented which cure in times which are comparable with those obtained using isocyanate/hydroxyl systems without the associated disadvantages of toxicity and give hard, glossy, clear films with good solvent and water resistance. These compositions are particulaly useful as clear coatings applied over pigmented basecoats.

According to the present invention there is provided a curing composition comprising a polymer component and a compatable oligomeric component, the polymer component being a co-polymer of functional silyl group-containing units derived from monomers of Formula (I):

$$CH_2=CR^1CO_2(CH_2)_aL \qquad \text{Formula (I)}$$

where a is 2 to 4
R$^1$ is hydrogen or methyl and
L is a group of Formula (II):

Formula (II)

where R$^2$ is C$_{1-4}$ alkoxy, C$_{2-4}$ alkoxy-C$_{2-4}$ alkoxy, C$_{2-4}$ alkanoyl, enolate, or oxime and R$^3$ and R$^4$ are as defined with reference to R$^2$ or are C$_{1-6}$ alkyl; and structural units derived from polymerisable ethylenically unsaturated monomers such that each molecule of the polymer component contains at least two silyl groups of Formula (II); the oligomeric component being a compound of Formula (III):

E(GKL)$_b$ Formula (III)

where b is 3 to 6; E is derived from a biuret or isocyanurate oligomer of a di-functional isocyanate the isocyanate being a C$_{4-15}$ aliphatic, cycloaliphatic or aromatic diisocyanate optionally substituted with one or more C$_{1-6}$ alkyl groups or E is derived from an adduct of C$_{2-6}$ aliphatic diol, triol or tetraol and a poly functional isocyanate, the poly functional isocyanate being either a di-functional isocyanate as previously defined or being itself the adduct of an aliphatic triol and a di-funtional isocyanate as previously defined;

G is $$-[O(CH_2)_5CO]_c[O(CH_2)_dOCO(CH_2)_2]-$$

in which c is 0 to 2, and d is 2 to 4 K is;

$$-[NR^5(CH_2)_m]-$$

in which m is 1 to 6, R$^5$ is hydrogen, methyl, $-(CH_2)_n-R^6$ or $-CH_2CHOH(CH_2)_n-R^6$, in which R$^6$ is the group L as defined with reference to Formula (II) and n is 1 to 6.

Preferably in the functional silyl group containing units of Formula (1), a is 3, R$^1$ is methyl and preferably in the silyl group of Formula (II) R$^2$, R$^3$ and R$^4$ are C$_1$ to C$_6$ alkoxy groups.

An example of such a polymerisable silyl compound of Formula (I) is methacryloxypropyl trimethoxysilane.

Examples of ethylenically unsaturated monomers from which the structural units may be derived are styrene and 1-10 alkyl acrylates and methacrylates in particular, methyl methacrylate, ethyl methacrylate, propyl methacrylate, pentyl methacrylate, hexyl methacrylate, dodecyl methacrylate, ethyl acrylate, propyl acrylate, butyl acrylate, pentyl acrylate, hexyl acrylate, octyl acrylate, 2-ethyhexyl acrylate, and dodecyl acrylate.

Preferably the units are C$_{1-6}$ alkyl esters of acrylic or methacrylic acid and styrene and especially are C$_{1-4}$ alkyl esters of acrylic and methacrylic acids and styrene.

In practice, the polymer component is such that its number average molecular weight is between 1,000 and 30,000 g mol$^{-1}$.

The synthesis of the polymer can be carried out by conventional polymerisation methods. Preferably polymerisation of the unsaturated compounds is conducted using non-reactive solvents such as hydrocarbons or esters.

The preferred method is by solution polymerisation of the monomers. In the method in order to obtain a silyl group containing polymer or co-polymer having an appropriate molecular weight, the polymerisable silane compound, together with any other monomers optionally selected as above, and a radical initiator, such as azodiisobutyronitrile, are added together in an appropriate solvent and reacted at 50-150 C.

An example of one class of oligomeric components are those in which E is the residue of Desmodur N3300 (Desmodur is a Registered Trade Mark), the residue of the isocyanurate trimer of hexamethylene diisocyanate idealised in Formula (IV).

Formula (IV)

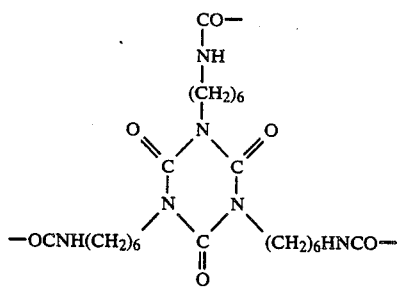

A further class of oligomeric components is those in which E is the residue of Desmodur L which is idealised as the residue of the adduct of three moles of toluene diisocyanate with one mole of trimethylol propane, as shown in Formula (V).

Formula (V)

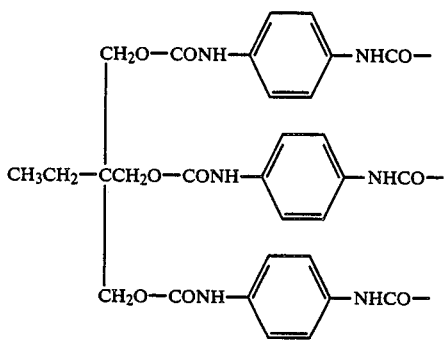

in which x+y=4. A diol of Formula (IV) is sold under the trade name Capa 200 ("Capa" is a registered Trade Mark)

Examples of triols which can be used are glycerol, trimethylol propane and 2 ethyl trimethylol propane.

One class of oligomeric components of Formula (III) is that in which G is

—[O(CH$_2$)$_5$CO]$_2$—[O(CH$_2$)$_2$]—[OCO(CH$_2$)$_2$]— which is derived from "Tone M100" (believed to be an adduct of 2 moles of capralactone and 1 mole of hydroxyethyl acrylate) (Tone is a registered Trade Mark).

A further class of oligomeric component of Formula (III) is that in which G is

—[O(CH$_2$)$_d$]—[OCO(CH$_2$)$_2$]— which are derived from hydroxyaklyl acrylates. Preferably in this class are those in which d is 2, derived from hydroxyethyl acrylate or those in which d is 4, derived from hydroxybutyl acrylate.

A further class of oligomeric component of Formula (III) is that in which

R$^5$ is either hydrogen or methyl, derived from an amino-alkyl silane compound. Preferably m is 3.

A further class of oligomeric component of formula (III) is that in which K is

—N(CH$_2$)$_m$—
 |
 (CH$_2$)$_n$—R$^6$ in which R$^6$ is defined with reference to Formula (II), n and m are preferably from 2 to 4, and which is derived from a di(alkylsilane) amine compound.

A further class of oligomeric component of Formula (III) is that in which K is

—[N(CH$_2$)$_m$]—
 |
 CH$_2$CH(CH$_2$)$_n$—R$^6$
 |
 OH which is derived from an γ-amino-alkyl silane compound in which the secondary amine is further reacted with an epoxy compound, preferably an γ-epoxy silane compound in which R$^6$ is L as previously defined in Formula (II) or hydrogen and n is 1 to 6.

In making the compositions of the invention, the polymer and oligomer components are combined in proportions such that the ratio of the number of silyl groups in the oligomer component, to those in the polymer component is in the range 1:4 to 2:1.

Each component is normally dissolved in dry organic solvent which can dissolve both the polymer and the oligomer component, and which either does not react with the silyl groups or which reacts reversibly with them. Examples of such solvents are aliphatic hydrocarbons, aromatic hydrocarbons, halogenated hydrocarbons, alcohols, ketones, esters, ethers or ether-alcohols.

The amount of the solvent will vary depending on the molecular weight of composition of the polymer and the cross-linker and will be so that the resulting composition is of the correct viscosity for the application method to be used.

A catalyst may be optionally used to accelerate the cross-linking reaction. The catalyst can be chosen from the compounds generally used as the curing catalysts for hydrolysable silyl group containing compounds. Examples of such catalysts are tin salts such as dibutyl tin dilaurate, dibutyl tin diacetate, tin octoate and dibutyl tin oxide, amines such as triethylamine, tetramethylguanidine and tri- ethylene diamine, and acids such as para-toluene sulphonic acid. The weight of catalyst used is up to 5% of the weight of the polymer component, preferably from 0.3 to 3% of the weight of the polymer component.

In addition, there can be added to a composition of this type additives such as UV absorbers, flow acids and water scavengers commonly used in paint formulations to modify application or final film properties.

The compositions of this invention can be used to coat surfaces by applying a film to the surface by standard techniques for example by dipping or with a brush or roller or with a spray gun and then allowing the solvent to evaporate.

The following Examples illustrate the invention.

EXAMPLES

All proportions are in parts by weight unless stated otherwise.

EXAMPLE 1

(i) Preparation of a Silane Functional Polymer Component

A solution of 6 parts of azodiisobutyronitrile in 72 parts of γ-methacryloxypropyltrimethoxysilane, 322.8 parts of methylmethacrylate, 93 parts of n-butyl methacrylate, and 112.2 parts of butyl acrylate were added dropwise with stirring over three hours to 400 parts of xylene at 80° C. under nitrogen. The mixture was stirred at 80° C. for a further hour. After each non-volatile contents determination which gave a value of below 60%, a further 1.5 grams of azodiisobutyronitrile were added and the mixture was stirred for a further 2 hours at 80° C.

This produces a silyl-group containing vinyl type polymer having a number average molecular weight as determined by gel-permeation chromatography of 10,000.

(ii) Preparation of an oligomer component from an isocyanate compound, hydroxybutyl acrylate and γ-aminopropyltriethoxysilane (a) Reaction of hydroxybutyl acrylate with an isocyanate oligomer.

A mixture of 192 g of Desmodur Z (thought to be the isocyanurate of isophorone diisocyanate) and 39.8 g of xylene were added over one hour to a stirred mixture of 80.0 grams of hydroxybutyl acrylate and 58.0 of xylene at 70° C. under dry air. The temperature was increased to 90° C. and the mixture was stirred until all the isocyanate had reacted. The mixture was allowed to cool.

(b) Reaction of γ-aminopropyltriethoxysilane with the product from (a)

132.5 g of γ-aminopropyltriethoxysilane and 96.0 g of xylene was added to the product from (i) the mixture being stirred and kept under nitrogen during the addition.

(iii) Composition 1

| Polymer component from (i) | 66.9 g |
|---|---|
| Oligomer Component from (ii) | 19.8 g |
| Dibutyl Tin Dilaurate Catalyst | 1.2 g |
| Thinner | 12.1 g |

The "thinner" used was formulated as follows:
Thinner

| Xylene | 50.0 g |
|---|---|
| Ethylene Glycol Mono butyl ether | 25.0 g |
| *Solvesso 100 | 25.0 g |

*Solvesso 100 is a mixture of C₉ aromatic hydrocarbons.

EXAMPLE 2

(i) Preparation of a Silane Functional Polymer Component

A solution of 12 parts of azodiisobutyro- nitrile in 66 parts of γ-methacryloxypropyl- trimethoxysilane, 138.0 parts of methylmethacrylate, 94.2 parts of n-butyl methacrylate, 113.4 parts of butyl acrylate and 188.4 parts of styrene was added dropwise with stirring over three hours to 400 parts of xylene at 120° C. under nitrogen and the mixture was stirred at 120° C. for a further hour.

After each non-volatile contents determination which gave a value below 60%, a further 3 grams of azodiisobutyronitrile were added and the mixture was stirred for a further hour at 120° C.

This produces a silyl-group containing vinyl type polymer having a molecular weight as determined by gel-permeation chromatography of 4,000.

(ii) Composition 2

| Polymer component from Example 2(i) | 65.7 g |
|---|---|
| Oligomer component from Example 1(ii) | 21.2 g |
| Dibutyl Tin Dilaurate Catalyst | 1.18 g |
| Thinner | 11.92 g |

EXAMPLE 3

(i) Preparation of an oligomeric component from an isocyanate compound hydroxybutyl acrylate and γ-aminopropyltriethoxysilane Reaction of isocyanate with the hydroxybutyl acrylate.

A mixture of 149.6 g of hydroxybutylacrylate, 16 g of butyl acetate and 91.4 g of xylene was slowly added to a stirred solution of 203 g of Desmodur N3300 (thought to be a hexamethylene diisocyanate isocyanurate trimer) in 14.2 g of butyl acetate and 132 g of xylene at 70° C. under dry air. The mixture was held at 90° C. until all the isocyanate had reacted. A mixture of 228.4 g of γ-aminopropyltriethoxy-silane, 16.2 g of butyl acetate and 149.2 g of xylene was added slowly at 25° C. An infrared spectrum of the mixture showed no peak at 1640 cm$^{-1}$ due to the carbon-carbon double bond.

(ii) Composition 3

| Polymer component from Example 2(i) | 68.0 g |
|---|---|
| Oligomer component from Example 3(i) | 14.7 g |
| Dibutyl Tin Dilaurate Catalyst | 1.2 g |
| Thinner | 16.1 g |

EXAMPLE 4

(i) Composition 4

| Polymer component from Example 1(i) | 66.9 g |
|---|---|
| Oligomer component from Example 3(i) | 15.8 g |
| Dibutyl Tin Dilaurate Catalyst | 1.2 g |
| Thinner | 16.1 g |

EXAMPLE 5

(i) Preparation of an oligomer component from an isocyanate compound, hydroxybutyl acrylate, a diol and γ-aminopropyltriethoxysilane A mixture of 110.1 g of hydroxybutylacrylate and 79.9 g of xylene was added over 30 minutes to a stirred solution of 225.6 g of Desmodur N3300 (thought to be a hexamethylene diisocyanate isocyanurate trimer) in 162.4 g of xylene at 70° C. under dry air. The mixture was stirred at 90° C. until the isocyanate had reacted. A solution of 76.7 g of an aliphatic polyester poly-ether diol (Capa200) in 53 g of xylene was added over 30 minutes. The mixture was stirred for a further 3 hours while the temperature was maintained at between 70° C. and 90° C. and was allowed to cool to room temperature. A solution of 169.2 g of γ-aminopropyltriethoxysilane in 123.1 g of xylene was added over 15 minutes. The mixture was heated to 50° C. for 30 minutes.

(ii) Composition 5

| Polymer component from Example 2(i) | 66.3 g |
|---|---|

-continued

| Oligomer component from Example 5(i) | 16.5 g |
|---|---|
| Dibutyl Tin Dilaurate Catalyst | 1.19 g |
| Thinner | 16.01 g |

EXAMPLE 6

Composition 6

| Polymer component from Example 1 (i) | 65.1 g |
|---|---|
| Oligomer component from Example 5 (i) | 17.6 g |
| Dibutyl Tin Dilaurate Catalyst | 1.17 g |
| Thinner | 15.83 g |

EXAMPLE 7

(i) Preparation of an oligomer component from an isocyanate compound trimethylol propane, 2-hydroxyethyl acrylate and γ-aminopropyltriethoxysilane A mixture of 479.7 g of Desmodur Z (thought to be the isocyanurate of isophorone diisocyanate), 89.3 g of xylene and 9.8 g of butyl acetate was added over 80 min. to a stirred solution of 98.4 g of 2-hydroxyethyl acrylate in 64.2 g of xylene and 7.1 g of butylacetate at 70° C. The mixture was held at 90° C. until the isocyanate value, by titration, had fallen to ⅔ of the original value, and allowed to cool to 25° C. A solution of 18.6 g of trimethylol propane in 13.7 g of butyl acetate was added with stirring and the temperature was raised to 90° C. for one hour. An infra red spectrum of this mixture showed no peak at 2250 cm$^{-1}$ corresponding to the isocyanate group.

A mixture of 187.3 g of γ-aminopropyltriethoxysilane and 31.9 g of xylene were added with stirring over 90 minutes. An infra red spectrum of the mixture showed no peaks at 1640 cm$^{-1}$ due to the carbon-carbon double bond.

(ii) Composition 7

| Polymer component from Example 2(i) | 57.1 g |
|---|---|
| Oligomer component from Example 7(i) | 26.2 g |
| Dibutyl Tin Dilaurate Catalyst | 1.02 g |
| Thinner | 15.68 g |

EXAMPLE 8

(i) Composition 8

| Polymer component from Example 1(i) | 55.5 g |
|---|---|
| Oligomer component from Example 7(i) | 27.8 g |
| Dibutyl Tin Dilaurate Catalyst | 0.99 g |
| Thinner | 15.71 g |

EXAMPLE 9

(i) Preparation of an oligomer component from an isocyanate compound a hydroxyacrylic compound and γ-aminopropyltriethoxysilane A mixture of 262.1 g of an adduct of 2-hydroxyethyl acrylate and two molecules of caprolactone (Tone M100), 170.9 g of xylene and 18.9 g of butyl acetate were added to 149.9 g of stirred solution of Desmodur N3300 (thought to be a hexamethylene diisocyanate isocyanurate trimer) in 98 g of xylene and 10.5 g of butyl acetate at 70° C. and stirred at 90° C. until all the isocyanate had reacted.

168 g of γ-aminopropyltriethoxysilane was added in 41.8 grams of xylene and 4 g of butylacetate whilst stirring at 25° C. Stirring continued at 50° C. until all the double bond had reacted shown by the absence of the peak in the infrared spectrum at 1640 cm$^{-1}$.

(ii) Composition 9

| Polymer component from Example 2(i) | 66.7 g |
|---|---|
| Oligomer component from Example 9(i) | 16.1 g |
| Dibutyl Tin Dilaurate Catalyst | 0.92 g |
| Thinner | 16.28 g |

EXAMPLE 10

(i) Composition 10

| Polymer component from Example 1(i) | 65.4 g |
|---|---|
| Oligomer component from Example 9(i) | 17.3 g |
| Dibutyl Tin Dilaurate Catalyst | 1.17 g |
| Thinner | 16.13 g |

EXAMPLE 11

(i) Preparation of an oligomer component from an isocyanate compound, hydroxybutyl, acrylate, γ-aminopropyltriethoxysilane and γ-glycidoxypropyltrimethoxysilane A mixture of 164.5 g of Desmodur Z (thought to be the isocyanurate of isophorone diisocyanate) 73.7 g of xylene and 8.3 g of butyl acetate was added over 60 minutes to a stirred mixture of 58.1 g of hydroxybutyl acrylate at 70° C. The preparation was stirred at 90° C. until all the isocyanate had reacted and there was no peak at 2250 cm$^{-1}$ in the infrared spectrum of the mixture, demonstrating the absence of the isocyanate group.

A mixture of 200.5 g of γ-aminopropyltriethoxysilane 79.9 g of toluene and 9.3 g of butyl acetate was added and the reaction was monitored by loss of peak due to the carbon-carbon bond at 1640 cm$^{-1}$. When the reaction was complete a solution of 159.8 g of γ-glycidoxypropyltrimethoxysilane in 14.5 g of butyl acetate and 231 g of xylene was added and the mixture was heated to 50° C. until the infrared spectrum of the mixture showed the absence of a peak at 940–960 cm$^{-1}$ due to the epoxide group.

(ii) Composition 11

| Polymer component from Example 2(i) | 71.9 g |
|---|---|
| Oligomer component from Example 11(i) | 15.3 g |
| Dibutyl Tin Dilaurate Catalyst | 0.93 g |
| Thinner | 11.87 g |

EXAMPLE 12

(i) Composition 12

| Polymer component from Example 1(i) | 71.1 g |
|---|---|
| Oligomer component from Example 11(i) | 16.5 g |
| Dibutyl Tin Dilaurate Catalyst | 1.27 g |
| Thinner | 11.28 g |

EXAMPLE 13

(i) Preparation of a silane-functional polymer component

| Monomer | Weight |
|---|---|
| FEED A | |
| Isobornyl Methacrylate | 290.0 g |
| Styrene | 145.0 g |
| Methyl Methacrylate | 145.0 g |
| γ-Methacryloxypropyltrimethoxysilane | 145.0 g |
| Genitron AZM | 36.25 g |
| Butyl acetate | 82.5 g |
| FEED B | |
| Butyl acetate | 41.25 g |
| γ-mercaptopropyltrimethoxysilane (chain transfer agent) | 36.75 g |

The above feeds A and B were simultaneously added dropwise over a period of two hours to butyl acetate (137.5 g) while the butyl acetate was at reflux temperature with stirring under a nitrogen blanket. On completion of the addition of the two feeds, a mixture of butyl acetate (6.9 g) and genitron AZM (2.9 g) was added. The contents of the flask were held at reflux for one hour. A mixture of butyl acetate (6.9 g) and genitron AZM were added and the contents of the flask were held at reflux for a further 1.5 hours.

This produced a silyl group-containing vinyl type polymer having a number average molecular weight as determined by gel permeation chromatography of 1,210.

(ii) Composition 13

| Polymer component from Example 13(i) | 10.0 g |
|---|---|
| Oligomer component from Example 2 (i) | 2.86 g |
| Dibutyl Tin Dilaurate Catalyst | 0.18 g |
| Xylene | 2.66 g |

(iii) Composition 14

| Polymer component from Example 13(i) | 10.0 g |
|---|---|
| Dibutyl Tin Dilaurate Catalyst | 0.18 g |
| Xylene | 2.38 g |

EXAMPLE 14

(i) Preparation of a silane-functional polymer component

| Monomer | Weight |
|---|---|
| FEED A | |
| Methyl methacrylate | 535.0 g |
| Styrene | 145.0 g |
| γ-methacryloxypropyltrimethoxysilane | 145.0 g |
| Genitron AZM | 36.25 g |
| Butyl acetate | 82.5 g |
| FEED B | |
| Butyl acetate | 41.25 g |
| γ-mercaptopropyltrimethoxysilane (chain transfer agent) | 36.25 g |

The above feeds A and B were simultaneously added dropwise over a period of two hours to butyl acetate (137.5 g) at reflux, 120° C., stirred under nitrogen. On completion of the feed additions, a mixture of butyl acetate (6.9 g) and Genitron AZM (2.9 g) were added. The reaction mixture was held at reflux for one hour. A mixture of butyl acetate (6.9 g) and Genitron AZM (2.9 g) were added. The reaction mixture was held at reflux for a further 1.5 hours. The mixture was allowed to cool to room temperature. Butyl acetate (215.0 g) was added to reduce the viscosity.

This produced a silane functional vinyl-type polymer of solids content 60%, and number average molecular weight as determined by gel permeation chromatography of 1,079.

(ii) Composition 15

| Polymer component from Example 14 (i) | 10.0 g |
|---|---|
| Oligomer component from Example 3 (i) | 2.86 g |
| Dibutyl Tin Dilaurate catalyst | 0.18 g |
| Xylene | 2.38 g |

(iii) Composition 16

| Polymer component from Example 14(i) | 10.0 g |
|---|---|
| Dibutyl Tin Dilaurate catalyst | 0.18 |
| Xylene | 2.38 |

EXAMPLES 17-24

These examples show the effects of the variation of the catalyst level in a single polymer/oligomer composition.

To a composition comprising 28.6 g of the oligomer from Example 3(i) and 100 g of the polymer from Example 1(i) were added various amounts of two catalysts, dibutyltin dilaurate (DBTDL) and dibutyltin diacetate (DBTDA). The compositions were reduced to 50% non vol. with xylene.

| Composition | Oligomer | Polymer | DBTDL | DBTDA | % |
|---|---|---|---|---|---|
| 17 | 28.6 | 100 | 1.8 | — | 3 |
| 18 | 28.6 | 100 | 1.2 | — | 2 |
| 19 | 28.6 | 100 | 0.6 | — | 1 |
| 20 | 28.6 | 100 | 0.18 | — | 0.3 |
| 21 | 28.6 | 100 | — | 0.1 | 3 |
| 22 | 28.6 | 100 | — | 0.066 | 2 |
| 23 | 28.6 | 100 | — | 0.033 | 1 |
| 24 | 28.6 | 100 | — | 0.009 | 0.3 |

Examples 25-30

These examples show the effect of the variation of the ratio of oligomer component to the polymer component in compositions with constant polymer and oligomer type.

Compositions 25 to 30 comprising various ratios of the oligomer component from Example 3(i) and the polymer component from Example 1(i) together with fixed amounts of dibutyltin dilaurate (DBTDL) catalyst, diluted to 50% non vol content with xylene. The '%' figure relates to the theoretical percentage of the number of siloxane groups on the polymer component to those on the oligomer component. Other figures are in grams.

| Composition | oligomer | polymer | DBTDL | % |
|---|---|---|---|---|
| 25 | 57.2 | 100 | 1.8 | 200 |
| 26 | 28.6 | 100 | 1.8 | 100 |

| Composition | oligomer | polymer | DBTDL | % |
|---|---|---|---|---|
| 27 | 21.4 | 100 | 1.8 | 75 |
| 28 | 14.3 | 100 | 1.8 | 50 |
| 29 | 7.1 | 100 | 1.8 | 25 |
| 30 | 0 | 100 | 1.8 | 0 |

Comparative Examples

In order to establish the advantageous properties of the compositions of the invention in relation to the state of the art Examples 1, 3, and 4 of the Japanese Application No. 60-44549 were repeated as follows

EXAMPLE 31

(i) Prior Art Manufacturing Example 1

Isophorone diisocyanate (0.2 mole) and dibutyl tin dilaurate (0.05 g) were mixed in xylene (60 ml) and heated to 80° C. to 90° C. Polypropylene glycol (M.W. 400, 0.13 mole)m was added dropwise over 1 hour and the reaction was continued for a further 4 hours at the same temperature, giving the urethane prepolymer with terminal NCO groups. The ethylene oxide addition product (2 molecules) of methanol (methyl carbitol, 0.03 mole) and γ-aminopropyl- trimethoxysilane (0.11 mole) were then added and reacted for 4 hours at the same temperature.

The temperature was then raised to 100° C. to 110° C. and a mixture of n-butyl methacrylate (0.3 mole) γ-methacryloxypropyltrimethoxysilane (0.05 mole) and azobisisobutyronitrile (0.5 g) was added dropwise over 30 minutes. The reaction was continued for a further 3 hours at the same temperature. Further azobisisobutyronitrile (0.1 g) was added and after a further 2 hours' reaction the mixture of the urethane prepolymer (A) with blocked terminal NCO groups and the vinyl resin (B) possessing hydrolysable side chain silyl groups was obtained.

(ii) Composition 31

| Product from Example 31(i) | 10.0 g |
|---|---|
| Dibutyl Tin Dilaurate | 0.2 g |

EXAMPLE 32

(i) Prior Art Manufacturing Example 3

Isophorone diisocyanate (0.2 mole) and dibutyl tin dilaurate (0.05 g) were mixed in xylene (60 ml) and the temperature raised to 90° C. Polypropylene glycol (M.W. 400, 0.13 mole) was dropped in over 1 hour and the urethane prepolymer with terminal NCO groups was obtained after a further 4 hours' reaction at the same temperature. Methyl carbitol (0.034 mole) and γ-aminopropyltrimethoxysilane (0.11 mole) were added and reacted at the same temperature for 4 hours. When a sample of the resulting solution was taken and the solvent was removed under reduced pressure, a blocked urethane prepolymer (A) of molecular weight approximately 1200 was obtained. The free NCO content was zero.

(ii) Composition 32

| Product from Example 32(i) | 10.0 g |
|---|---|
| Dibutyl Tin Dilaurate | 0.2 g |

EXAMPLE 33

(i) Prior Art Manufacturing Example 4

A mixture of n-butyl methacrylate (0.3 mole), γ-methacryloxypropyltrimethoxysilane (0.05 mole) and azobisisobutyronitrile (0.5 g) was added dropwise to xylene (60 ml) at 100 to 110 over 30 minutes. The reaction was continued for 3 hours at the same temperature. Further azobisisobutyronitrile (0.1 gram) was added and reacted for 2 hours, giving the vinyl resin (B) with hydrolysable side chain silyl groups. It was ascertained that there was no absorbtion at 1648 $cm^1$ in the infrared absorption spectrum of the product.

(ii) Composition 33

| Product from Example 33(i) | 10.0 g |
|---|---|
| Dibutyl Tin Dilaurate | 0.2 g |

EXAMPLE 34

Composition 34

| Product from Example 32(i) | 5.0 g |
|---|---|
| Product from Example 33(i) | 5.0 g |
| Dibutyl Tin Dilaurate | 0.2 g |

EXAMPLE 35

Composition 35

| Product from Example 32(i) | 8.0 g |
|---|---|
| Product from Example 33(i) | 2.0 g |
| Dibutyl Tin Dilaurate | 0.2 g |

EXAMPLE 36

Composition 36

A composition representing a standard non-pigmented isocyanate-hydroxyl clearcoat, was made up comprising

| Macrynal 510n ("Macrynal is registered Trade Mark) | 67 parts by weight |
|---|---|
| Isocyanate cross-linker | 33 parts by weight |

The isocyanate crosslinker was Desmodur N.

TESTING THE COMPOSITIONS

For comparison and testing purposes films were formed from these compositions by spreading them at a thickness of 200 microns with a Sheen 200μ block spreader (Sheen is a Registered Trade Mark) over a degreased, clean glass substrate. All resins were applied at 50% non vol. Dilutions were carried out with suitable solvents such as xylene as necessary.

The films so formed were allowed to cure overnight at and the following tests were carried out on each film.

Clarity: assesed by eye.

MEK rubs: rubbing the panel with a rag soaked in MEK (Methyl Ethyl Ketone).

Petrol Test: the panel is covered with an absorbent pad which has been soaked with petrol. After 15 minutes the pad is removed.

Water Spot Test: a few drops of distilled water are placed on the panel, left for 2 hours then wiped off.

Erichsen Hardness: number of swings given by the Erichsen Hardness Apparatus.

Pencil Hardness: The hardest pencil which may be drawn across the surface of the film without scratching through to the substrate.

The test results for each film over glass are given in Table 1. The rating system used is given in Table 3.

It can be seen from Table 1 that the compositions according to the invention (compositions 1 to 28) give acceptable Erichsen hardness and pencil hardness, have petrol resistance which is comparable with or better than the prior art while having superior clarity, water resistance and MEK rub resistance.

In order to illustrate the use of some of these compositions in a paint system they were thinned to spraying viscosity by the addition of xylene and applied by compressed air spray over a commonly used nitrocellulose basecoat "Belco" ("Belco" is a registered trade mark). The results of testing these films after curing overnight at room temperature are given in Table 2. It can be seen that in these less controlled tests the advantages of the films formed from the compositions of the invention are comparable with those seen in the more controlled test over the glass substrate.

TABLE 1

| Comp | Clarity | Hardness Pencil | Hardness Erichsen | MEK | Resistance Petrol | Resistance Water |
|---|---|---|---|---|---|---|
| 1 | 1 | H | 69 | 98 | 3 | 1 |
| 2 | 1 | H | 30 | 150 | 2 | 1 |
| 3 | 1 | H | 20 | >300 | 1 | 1 |
| 4 | 1 | H | 27 | >300 | 4 | 1 |
| 5 | 2 | H | 23 | >300 | 4 | 1 |
| 6 | 3 | H | 36 | >300 | 1 | 1 |
| 7 | 1 | H | 55 | 110 | 4 | 1 |
| 8 | 1 | H | 79 | >200 | 3 | 1 |
| 9 | 4 | 2B | 31 | 172 | 1 | 1 |
| 10 | 2 | B | 27 | 100 | 5 | 1 |
| 11 | 1 | H | 17 | 170 | 5 | 1 |
| 12 | 1 | 3H | 29 | >200 | 1 | 1 |
| 13 | 1 | 4H | 51 | 240 | 1 | 1 |
| 14 | 1 | 4H | 54 | 53 | 2 | 1 |
| 15 | 1 | 4H | 53 | >250 | 1 | 1 |
| 16 | 1 | H | 57 | 61 | 1 | 1 |
| 17 | 1 | 5H | 44 | >200 | 1 | 1 |
| 18 | 1 | 5H | 20 | >200 | 2 | 1 |
| 19 | 1 | 5H | 36 | >200 | 1 | 1 |
| 20 | 1 | 4H | 28 | >200 | 2 | 1 |
| 21 | 1 | 5H | 36 | >200 | 1 | 1 |
| 22 | 1 | 4H | 31 | >200 | 1 | 1 |
| 23 | 1 | 4H | 37 | >200 | 1 | 1 |
| 24 | 1 | 4H | 37 | >200 | 1 | 1 |
| 25 | 1 | 4H | 38 | >200 | 1 | 1 |
| 26 | 1 | 5H | 44 | >200 | 1 | 1 |
| 27 | 1 | 4H | 43 | 174 | 1 | 1 |
| 28 | 1 | 5H | 57 | 67 | 1 | 1 |
| 29 | 1 | 4H | 47 | 88 | 1 | 1 |
| 30 | 1 | B | 33 | 56 | 2 | 1 |
| 31 | 4 | 6B | 7 | 4 | 5 | 3 |
| 32 | 2 | 3B | 4 | 27 | 4 | 3 |
| 33 | 2 | 3H | 34 | 21 | 5 | 1 |
| 34 | 4 | 2B | 22 | 26 | 4 | 3 |
| 35 | 4 | 3B | 5 | 6 | 5 | 3 |
| 36 | 1 | B | 32 | 75 | 1 | 1 |

TABLE 2

| Composition | Erichsen Hardness | MEK | Resistance Petrol | Resistance Water |
|---|---|---|---|---|
| 1 | 35 | 100 | 3 | 1 |
| 2 | 36 | 200 | 3 | 1 |
| 3 | 15 | 140 | 3 | 1 |
| 4 | 18 | 140 | 1 | 1 |
| 5 | 12 | 118 | 5 | 1 |
| 6 | 22 | 121 | 3 | 1 |
| 7 | 23 | 100 | 2 | 1 |
| 8 | 40 | 77 | 1 | 1 |
| 9 | 17 | 60 | 5 | 1 |
| 10 | 27 | 67 | 5 | 1 |
| 11 | 18 | 58 | 5 | 1 |
| 12 | 39 | 50 | 4 | 1 |
| 31 | 7 | 8 | 5 | 3 |
| 32 | 2 | 5 | 5 | 4 |
| 33 | 48 | 96 | 5 | 1 |
| 34 | 13 | 36 | 5 | 2 |
| 35 | 3 | 10 | 5 | 3 |
| 36 | 19 | 128 | 1 | 1 |

TABLE 3

Ratings for comparative results

Clarity
1 = Very good clear films
2 = Clear film
3 = Slightly hazy
4 = Hazy
5 = Badly Hazy Petrol
1 = Unaffected
2 = Very slight softening
3 = Slight softening
4 = Softening
5 = Bad/Severe Softening Water
1 = Unaffected
2 = Slight softening
3 = Softening and marking
4 = Bad softening

We claim:
1. A curing composition comprising a polymer component and a compatible oligomeric component, the polymer component being a co-polymer of functional silyl group-containing units derived from monomers of Formula (1):

$$CH_2=CR^1CO_2(CH_2)_aL \qquad \text{Formula (I)}$$

where a is 2 to 6
$R^1$ is hydrogen or methyl and
L is a group of Formula (II):

  Formula (II)

where $R^2$ is $C_{1-4}$ alkoxy, $C_{2-4}$ alkoxy—$C_{2-4}$ alkoxy, $C_{1-4}$ alkanoyl, enolate or oximate, and $R^3$ and $R^4$ are $C_{1-4}$ alkoxy, $C_{2-4}$ alkoxy—$C_{2-4}$ alkoxy, $C_{1-4}$ alkanoyl, enolate, oximate or $C_{1-6}$ alkyl; and structural units derived from polymerisable ethylenically unsaturated monomers such that each molecule of the polymer component contains at least two silyl groups of Formula (II); the oligomeric component being a compound of Formula (III):

$$E(GKL)_b \qquad \text{Formula (III)}$$

where b is 3 to 6; E is derived from a biuret or isocyanurate oligomer of a di-functional isocyanate, the isocyanate being a $C_{4-15}$ aliphatic, cycloaliphatic or aromatic diisocyanate optionally substituted with one or more $C_{1-6}$ alkyl groups or is derived from an adduct of $C_{2-6}$ aliphatic diol, triol or tetraol and a poly functional isocyanate, the poly functional isocyanate being either a di-functional isocyanate as previously defined or being itself the adduct of an aliphatic triol and a di-functional isocyanate as previously defined,
G is $$-[O(CH_2)_5CO]_c[O(CH_2)_dOCO(CH_2)_2]-$$

in which c is 0 to 2, d is 2 to 4;
K is $$-[NR^5(CH_2)_m]-$$

in which m is 1 to 6, and $R^5$ is hydrogen, methyl, $-(CH_2)_nR^6$, or $-CH_2CHOH(CH_2)_n-R^6$ in which $R^6$ is the group L as defined with reference to Formula (I) and n is 1 to 4.

2. A curing composition according to claim 1 comprising a polymer component and a compatable oligomeric component, the polymer component being a copolymer of functional silyl group-containing units derived from monomers of Formula (1):

$$CH_2=CR^1CO_2(CH_2)_aL \qquad \text{Formula (I)}$$

where a is 2 to 6
$R^1$ is hydrogen or methyl and
L is a group of Formula (II):

Formula (II)

where
$R^2$ is $C_{1-4}$alkoxy, $C_{2-4}$alkoxy-$C_{2-4}$ alkoxy, $C_{1-4}$ alkanoyl, enolate or oxime and $R^3$ and $R^4$ are as defined with reference to $R_2$ or are $C_{1-6}$alkyl; and structural units derived from polymerisable ethylenically unsaturated monomers such that each molecule of the polymer component contains at least two silyl groups of Formula (II);
the oligomeric component being a compound of Formula (III):

$$E(GKL)_b \qquad \text{Formula (III)}$$

where b is 3 to 6; E is derived from a biuret or isocyanurate oligomer of a di-functional isocyanate the isocyanate being a $C_{4-15}$ aliphatic, cycloaliphatic or aromatic diisocyanate optionally substituted with one or more $C_{1-6}$ alkyl groups or is derived from an adduct of $C_{2-6}$ aliphatic diol triol or tetraol and a poly functional isocyanate, the poly functional isocyanate being either a di-functional isocyanate as previously defined or being itself the adduct of an aliphatic triol and a di-functional isocyanate as previously defined,
G is $$-[O(CH_2)_5CO]_c[O(CH_2)_dOCO(CH_2)_2]-$$

in which c is 0 to 2, d is 2 to 4;
K is $$-[NR^5(CH_2)_m]-$$

in which m is 1 to 6, and $R^5$ is hydrogen, or $-CH_2CHOH(CH_2)_n-R^6$ in which $R^6$ is the group L as defined with reference to Formula (I) and n is 1 to 6.

3. A composition according to claim 1 where the number average molecular weight of the polymer component is between 1,000 and 30,000 g $mol^{-1}$.

4. A composition according to claim 1 where in Formula (III) b is 3, in the group G, c is 0, and d is 4, and in the group K, m is 3 and $R^5$ is hydrogen.

5. A composition according to claim 1 where in Formula (III) b is 4, in the group G, c is 0, d is 4, and in the group K, m is 3 and $R^5$ is hydrogen.

6. A composition according to claim 1 where in Formula (III) b is 6, in the group G, c is 0, d is 2 and where in the group K, m is 3 and $R^5$ is hydrogen.

7. A composition according to claim 1 where in Formula (III) b is 3, in the group G, c is 2, d is 2 and where in the group K, m is 3 and $R^5$ is hydrogen.

8. A composition according to claim 1 where in Formula (III) b is 3, in the group G, c is 0, d is 4, and where in the group K, $R^5$ is $CH_2CHOH(CH_2)-L$ 9. A method of coating a target object which comprises applying a layer of a composition according to claim 1 and allowing the layer to cure.

* * * * *

REEXAMINATION CERTIFICATE (1336th)
United States Patent [19]

Palluel et al.

[11] B1 4,785,035

[45] Certificate Issued    Jul. 31, 1990

[54] CURING COMPOSITION

[75] Inventors: August L. L. Palluel, Windsor; Stephen P. Davis, High Wycombe Bucks; Angela C. Fletcher, London, all of United Kingdom

[73] Assignee: Imperial Chemical Industries PLC, London, England

Reexamination Request:
No. 90/001,926, Dec. 29, 1989

Reexamination Certificate for:
Patent No.: 4,785,035
Issued: Nov. 15, 1988
Appl. No.: 114,735
Filed: Oct. 30, 1987

[30] Foreign Application Priority Data

Nov. 14, 1986 [GB] United Kingdom ................. 8627314

[51] Int. Cl.$^5$ .............................................. C08L 75/00
[52] U.S. Cl. ....................................... 524/101; 524/188

[56] References Cited

U.S. PATENT DOCUMENTS

| | | | |
|---|---|---|---|
| 4,429,082 | 1/1984 | Lee et al. | 525/426 |
| 4,614,777 | 9/1986 | Kania | 526/279 |
| 4,652,610 | 3/1987 | Dowbenko et al. | 525/100 |

FOREIGN PATENT DOCUMENTS

| | | |
|---|---|---|
| 0063753 | 7/1986 | European Pat. Off. |
| 0210444 | 2/1987 | European Pat. Off. |
| 61-108622 | 5/1986 | Japan |
| 2012292 | 7/1979 | United Kingdom |

*Primary Examiner*—Maurice J. Welsh

[57] ABSTRACT

A curing composition comprising a silane functional acrylic polymer component and a silane functional oligomer component. The polymer component is a co-polymer of functional silyl group-containing units derived from monomers of Formula:

$$CH_2=CR^1CO_2(CH_2)_aL$$

The oligomer component is of formula $$E(GKL)_6$$

in which E is derived from a multifunctional isocyanate oligomer, G is of general formula:

$$-[O(CH_2)_5CO]_c[O(CH_2)_4OCO(CH_2)_2]-$$

and K is of general formula:

$$-[NR^5(CH_2)_m]-$$

and where L is a group of Formula $$\begin{array}{c} R^3 \\ / \\ Si-R^3 \\ \backslash \\ R^4 \end{array}$$

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-9 is confirmed.

New claim 10 is added and determined to be patentable.

*10. A two component composition consisting essentially of a polymer component and a compatible oligomeric component, the polymer component being a co-polymer of functional silyl group-containing units derived from monomers of Formula (I):*

$$CH_2=CR^1CO_2(CH_2)_aL \qquad \text{Formula (I)}$$

*Where a is 2 to 6*
*$R^1$ is hydrogen or methyl and*
*L is a group of Formula (II):*

Formula (II)

*where $R^2$ is $C_{1-4}$ alkoxy, $C_{2-4}$ alkoxy—$C_{2-4}$ alkoxy, $C_{1-4}$ alkanoyl, enolate or oximate and $R^3$ and $R^4$ are $C_{1-4}$ alkoxy, $C_{2-4}$ alkoxy—$C_{2-4}$ alkoxy, $C_{1-4}$ alkanoyl, enolate, oximate or $C_{1-6}$ alkyl; and structural units derived from polymerisable ethylenically unsaturated monomers such that each molecule of the polymer component contains at least two silyl groups of Formula (II); the oligomeric component being a compound of Formula (III):*

$$E(GKL)_b \qquad \text{Formula (III)}$$

*where b is 3 to 6; E is derived from a biuret or isocyanurate oligomer of a di-functional isocyanate the isocyanate being a $C_{4-15}$ aliphatic, cycloaliphatic or aromatic diisocyanate optionally substituted with one or more $C_{1-6}$ alkyl groups or is derived from an adduct of $C_{2-6}$ aliphatic diol, triol or tetraol and a poly functional isocyanate, the poly functional isocyanate being either a di-functional isocyanate as previously defined or being itself the adduct of an aliphatic triol and a di-functional isocyanate as previously defined, G is*

$$-[O(CH_2)_5CO]_c[O(CH_2)_dOCO(CH_2)_2]-$$

*in which c is 0 to 2, d is 2 to 4; K is*

$$-[NR^5(CH_2)_m]-$$

*in which m is 1 to 6, and $R^5$ is hydrogen, methyl, $-(CH_2)_nR^6$, or $-CH_2CHOH(CH_2)_nR^6$ in which $R^6$ is the group L as defined with reference to Formula (I) and n is 1 to 4.*

* * * * *